(12) United States Patent
Hillberg et al.

(10) Patent No.: US 6,788,034 B2
(45) Date of Patent: Sep. 7, 2004

(54) METHOD FOR OPERATING A TRANSFORMER FROM A DRIVABLE VOLTAGE SOURCE, AS WELL AS AN APPARATUS FOR CARRYING OUT THE METHOD

(75) Inventors: Claes Hillberg, Möhlin (CH); Peter Daehler, Remigen (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 10/377,809

(22) Filed: Mar. 4, 2003

(65) Prior Publication Data

US 2003/0173939 A1 Sep. 18, 2003

(30) Foreign Application Priority Data

Mar. 18, 2002 (EP) ............................................. 02405208

(51) Int. Cl.$^7$ ................................................ G05F 1/12
(52) U.S. Cl. ........................ 323/247; 323/205; 323/276
(58) Field of Search ................................ 323/205, 206, 323/247, 276, 277, 330

(56) References Cited

U.S. PATENT DOCUMENTS

| | | | |
|---|---|---|---|
| 5,309,346 A | 5/1994 | Gyugyi | |
| 5,867,376 A | * 2/1999 | Nakamura et al. | ....... 363/56.01 |
| 5,977,659 A | 11/1999 | Takehara et al. | |

* cited by examiner

Primary Examiner—Jessica Han
(74) Attorney, Agent, or Firm—Burns, Doane, Swecker & Mathis, L.L.P.

(57) ABSTRACT

A method is specified for operating a transformer (1) from a drivable voltage source (2), in which the voltage source, (2) produces an output voltage ($u_A$) for feeding active power and/or a reactive component via the transformer (1) into an electrical AC voltage supply network (3), and an output current ($i_A$) from the voltage source (2) is monitored for a maximum permissible value ($i_{Amax}$) in which the magnetic flux ($\phi$) of the transformer (1) is determined continuously, and, when the maximum permissible value ($i_{Amax}$) of the output current ($i_A$) is exceeded, the voltage source (2) is disconnected from the transformer (1). In response to a start signal ($S_S$), an output voltage ($u_A$) is formed as a function of a transformer voltage ($u_{TX}$), which was determined most recently before the maximum permissible value ($i_{Amax}$) of the output current ($i_A$) was exceeded, and as a function of a first magnetic flux ($\phi_1$), which was determined most recently before the maximum permissible value ($i_{Amax}$) of the output current ($i_A$) was exceeded, and of a second magnetic flux ($\phi_2$) determined at the time of the start signal ($S_S$), the output voltage ($u_A$) being applied to the transformer (1) for an adjustable time period ($T_0$) after an adjustable switching time ($t_0$). An apparatus is also specified for carrying out the method.

22 Claims, 5 Drawing Sheets

METHOD FOR OPERATING A TRANSFORMER FROM A DRIVABLE VOLTAGE SOURCE, AS WELL AS AN APPARATUS FOR CARRYING OUT THE METHOD

This application claims priority under 35 U.S.C. §§ 119 and/or 365 to Appln No 02405208.6 filed in Europe on Mar. 18, 2002; the entire content of which is hereby incorporated by reference.

TECHNICAL FIELD

The invention relates to the field of power electronics. It is based on a method for operating a transformer from a drivable voltage source, and on an apparatus for carrying out the method as claimed in the precharacterizing clause of the independent claims.

Prior Art

Transformers in conjunction with drivable voltage sources, in particular drivable voltage sources in the form of voltage converters, are nowadays used in a range of power-electronic circuits. One such voltage converter is disclosed in U.S. Pat. No. 5,309,346 and is normally connected via the transformer to an electrical AC voltage supply network and feeds and/or draws active power and/or a reactive component, in particular for stabilization of the network voltage of the electrical AC voltage supply network. The voltage converter is in this case driven by means of drive signals from a drive circuit that is normally provided. Furthermore, an electrical load which is connected to the electrical AC voltage supply network is supplied with electrical power via the transformer from the electrical AC voltage supply network and/or from the voltage converter.

In the case of a serious fault in the electrical AC voltage supply network, in particular resulting from a short circuit of the electrical AC voltage supply network, this network is disconnected from the electrical load by means of an isolating switch. The voltage converter must then provide the voltage required by the electrical load and the corresponding current via the transformer. The output current to be provided by the voltage converter is governed by the magnetization current of the transformer and by the load current for the electrical load. In the fault situation described above, the magnetization current will increase within a few microseconds after the occurrence of the short circuit, as a result of which the transformer is magnetized and may be driven into saturation. As a result of the high magnetization current, the output current to be provided by the voltage converter, that is to say the transformer current, can rise above the maximum permissible value for the voltage converter, as a result of which a protective apparatus which is normally provided, in particular an isolating switch, then blocks the voltage converter, in order to protect its power semiconductor switches, when the maximum permissible value is exceeded. However, this does not ensure that the electrical load is adequately supplied with power within a small number of time periods of the network voltage.

One known possible way to set the converter current below the maximum permissible value for the fault situation described above, and thus to ensure that the electrical load is supplied with electrical power, is to derate the transformer, in particular the iron core of the main inductance. In consequence, the magnetization current of the transformer can be effectively limited during the fault situation explained above, so that the output current can be kept below the maximum permissible value.

The derating of the transformer as described above results in the problem that this is accompanied by an increased space requirement and an increased use of material, so that the derating results in considerable costs.

DESCRIPTION OF THE INVENTION

The object of the invention is therefore to specify a method for operating a transformer from a drivable voltage source, which allows an electrical load which is fed from an electrical AC voltage supply network to be supplied by means of the voltage source via the transformer within a short time when a fault occurs in the electrical AC voltage supply network. Furthermore, an apparatus is to be specified, by means of which the method is carried out in a particularly simple manner. This object is achieved by the features of claims 1 and 11. Advantageous developments of the invention are specified in the dependent claims.

In the method according to the invention for operating a transformer from a drivable voltage source, the voltage source is driven such that it feeds active power and/or a reactive component via the transformer into an electrical AC voltage supply network, with an output current from the voltage source being monitored for a maximum permissible value. According to the invention, a transformer voltage which is applied to the transformer and the magentic flux of the transformer are determined continuously. If the maximum permissible value of the output current is exceeded, that is to say if a fault occurs in the electrical AC voltage supply network, in particular in the event of a short circuit occurring, the voltage source is driven such that the voltage source is disconnected from the transformer, with the power semiconductor switches in the voltage source preferably being blocked. In the fault situation mentioned above, this advantageously prevents the voltage source from being loaded with an output current which is to be supplied but which, as a result of the fault situation, is greater than the maximum permissible value, and prevents components in the voltage source, in particular power semiconductor switches, from being damaged or even destroyed. Furthermore, there is no need for any isolating switch, as is normally provided, for the disconnection of the voltage source.

Furthermore, according to the invention, in response to a start signal, an output voltage from the voltage source is formed as a function of a transformer voltage, which was determined most recently before the maximum permissible value of the output current was exceeded, and as a function of a first magnetic flux, which was determined most recently before the maximum permissible value of the output current was exceeded, and of a second magnetic flux determined at the time of the start signal. The voltage source is then driven such that the output voltage is applied to the transformer for an adjustable time period after an adjustable switching time. The output voltage which is formed represents a start value, so that the transformer, which is partially demagnetized or is essentially completely demagnetized in the event of a fault, can be brought to its original magnetization, that is to say to its magnetic flux as known before the fault situation. The application of the output voltage which is formed to the transformer after the adjustable switching time for the adjustable time period results in the magnetic flux building up to its value as known before the fault situation, that is to say up to its magnetization as known before the fault situation, as quickly as possible in an advantageous manner, without the maximum permissible value of the output current from the voltage source being exceeded in the process. This ensures that the electrical load can be supplied by the voltage source via the transformer within a short time when a fault occurs, as described above, in the electrical AC voltage supply network. The method according to the invention can be used in general in an advantageous manner for partially demagnetized or essentially completely demagnetized transformers, and is thus not restricted to the fault situation described above. Furthermore, the method according to the invention allows the transformer to be connected by means of the voltage source as quickly as possible and without any transients.

The apparatus according to the invention for carrying out the method for operating a transformer from a drivable voltage source has a drive device which is used for driving the voltage source, with the voltage source producing an output voltage, in accordance with the drive, for feeding active power and/or a reactive component via the transformer into the electrical AC voltage supply network. Furthermore, according to the invention, a first monitoring device is provided for monitoring the output current from the voltage source for a maximum permissible value and is connected on the input side to the drive device, with the drive device being driven, if the maximum permissible value of the output current from the voltage source is exceeded, such that the voltage source is disconnected from the transformer, preferably by blocking the power semiconductor switches in the voltage source. Furthermore, according to the invention, first means are provided for continuously determining the transformer voltage which is applied to the transformer, as well as a reference signal generator, which has second means for continuously determining the magnetic flux of the transformer and which is connected on the input side to the first means and on the output side to the drive device. The reference signal generator is advantageously designed such that, in response to the start signal which is supplied to the reference signal generator, an output voltage reference signal which corresponds to the output voltage is formed as a function of the transformer voltage which was determined most recently before the maximum permissible value of the output current was exceeded, and as a function of the first magnetic flux and of the second magnetic flux. Furthermore, the reference signal generator has an enable switching device, to which the output voltage reference signal, an adjustable switching time and an adjustable time period are supplied in order to enable the output voltage reference signal at the output of the reference signal generator. The apparatus according to the invention thus makes it possible for the method according to the invention for operation of a transformer from a drivable voltage source to be carried out in a particularly simple manner, in which case, furthermore, the apparatus can be produced very easily and at low cost, since the circuit complexity can be kept extremely low and, furthermore, only a small number of components are required to construct it.

These and further objects, advantages and features of the present invention will become evident from the following detailed description of one preferred exemplary embodiment of the invention in conjunction with the drawing.

Figure 1:
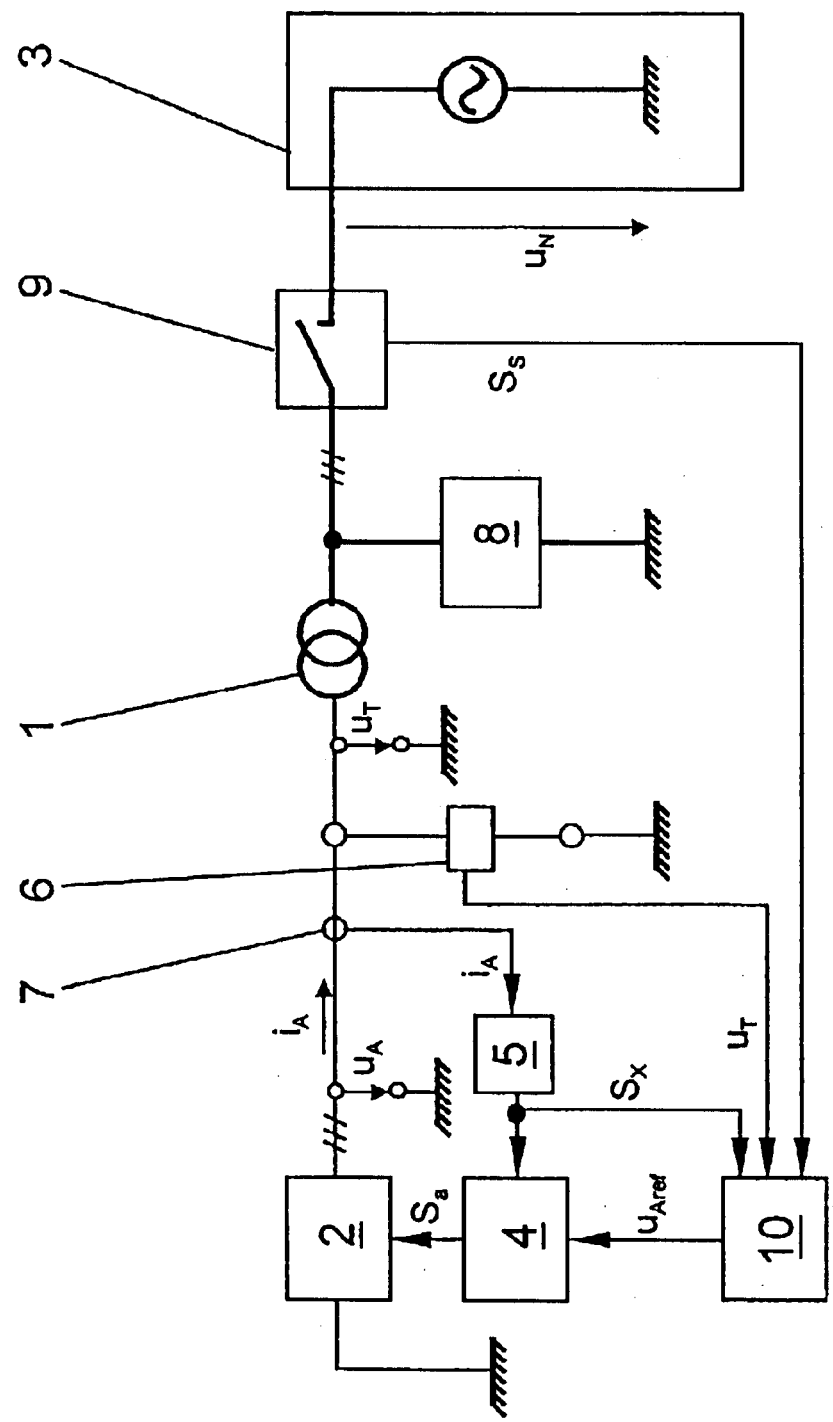
FIG. 1 shows an embodiment of an apparatus according to the invention for carrying out the method for operating a transformer from a drivable voltage source.

The reference symbols used in the drawing, and their meanings, are listed in summarized form in the list of reference symbols. In principle, identical parts are provided with the same reference symbols in the figures. The described embodiment represents an example of the subject matter of the invention and has no restrictive effect.

APPROACHES TO IMPLEMENTATION OF THE INVENTION

FIG. 1 shows an embodiment of an apparatus according to the invention for carrying out the method for operating a transformer 1 from a drivable voltage source 2. In particular, the voltage source 2 has a converter, which is not shown in any more detail for the sake of clarity but is driven by means of drive signals $S_a$ from a drive device 4. Depending on the drive, the voltage source 2 produces an output voltage $u_A$ for feeding active power and/or a reactive component via the transformer into an electrical, in particular three-phase, AC voltage supply network 3, with an output current $i_A$ from the voltage source 2 being monitored for a maximum permissible value $i_{Amax}$. According to FIG. 1, the electrical AC voltage supply network 3 is connected via a mains switch 9 to an electrical load 8 which is to be fed, with the electrical load 8 also being connected to the transformer 1.

In the method according to the invention for operating the transformer 1 from the drivable voltage source 2, a transformer voltage $u_T$ which is applied to the transformer 1 is determined continuously, in particular by measurement. Furthermore, the magnetic flux $\phi$ of the transformer 1 is determined continuously, and is preferably determined from the transformer voltage $u_T$. Furthermore, in the method according to the invention, when the maximum permissible value $i_{Amax}$ of the output current $i_A$ is exceeded, the voltage source 2 is driven such that it is disconnected from the transformer 1. Such exceeding of the maximum permissible value $i_{Amax}$ of the output current $i_A$ occurs, for example, in the event of a fault in the electrical AC voltage supply network 3, in particular in the event of a short circuit in the electrical AC voltage supply network 3. It is thus advantageously possible to prevent the voltage source 2 from being loaded, damaged or even destroyed by an output current $i_A$ which is to be supplied but which, as a result of the fault situation, is above the maximum permissible value $i_{Amax}$.

Furthermore, according to the invention, in response to a start signal $S_S$, which is preferably a confirmation signal from the mains switch 9 which has to be opened in the fault situation described above, an output voltage $u_A$ is formed as a function of a transformer voltage $u_{TX}$ which was determined most recently before the maximum permissible value $i_{Amax}$ of the output current $i_A$ was exceeded, and as a function of the first magnetic flux $\phi_1$, which was determined most recently before the maximum permissible value $i_{Amax}$ of the output current $i_A$ was exceeded, and of a second magnetic flux $\phi_2$ determined at the time of the start signal $S_S$. The first magnetic flux $\phi_1$ is preferably formed from the transformer voltage $u_{TX}$ which was determined most recently before the maximum permissible value $i_{Amax}$ of the output current $i_A$ was exceeded, and the second magnetic flux $\phi_2$ is formed from a transformer voltage $u_{TS}$ determined at the time of the start signal $S_S$. The first and second magnetic fluxes $\phi_1$, $\phi_2$ are advantageously formed by integration of the transformer voltage $u_{TX}$ which was determined most recently before the maximum permissible value $i_{Amax}$ of the output current $i_A$ was exceeded, for the first magnetic flux $\phi_1$, and, respectively, by integration of the transformer voltage $u_{TS}$, determined at the time of the start signal $S_S$, for the second magnetic flux $\phi_2$. This advantageously means that there is no need for a measurement device for determining the magnetic flux $\phi$ of the transformer 1.

Furthermore, the voltage source 2 is driven according to the invention such that the output voltage $u_A$ which is formed is applied to the transformer 1 for an adjustable time period $T_0$ after an adjustable switching time $t_0$. The output voltage $u_A$ which is formed represents a start value, so that the transformer 1, which is partially demagnetized or essentially completely demagnetized in the event of a fault, can be brought to its original magnetization, that is to say to its magnetic flux $\phi_1$ as was known before the fault situation. The application of the output voltage $u_A$ which is formed to the transformer 1 after the adjustable switching time $t_0$, which represents a start time, for the adjustable time period $T_0$ results in the magnetic flux $\phi$ building up as quickly as possible to its value $\phi_1$ which was known before the fault situation without in the process exceeding the maximum permissible value $i_{Amax}$ of the output current $i_A$ from the voltage source 2 as a result of saturation phenomena in the transformer 1. The voltage source 2 can thus supply the electrical load 8 via the transformer 1 within a short time in the event of a fault, as described above, in the electrical AC voltage supply network 3, without components in the voltage source 2, in particular power semiconductor switches, being excessively loaded, damaged or even destroyed when supplying the electrical load 8.

The formation of the output voltage $u_A$ for different situations will be explained in detail in the following text. Based on the method according to the invention, the output voltage $u_A$ is formed by first of all determining a phase angle $\psi_1$ of the first magnetic flux $\phi_1$ and a phase angle $\psi_2$ of the second magnetic flux $\phi_2$ and by forming a difference phase angle $\psi_D$ by means of subtraction from the phase angle $\psi_1$ of the first magnetic flux $\phi_1$ and from the phase angle $\psi_2$ of the second magnetic flux $\phi_2$. Furthermore, if the amplitude value $|\phi_2|$ of the second magnetic flux $\phi_2$ is essentially greater than zero and if the difference phase angle $\psi_D$ is essentially in the interval $0°<\psi_D<180°$, the adjustable switching time $t_D$ is chosen to be the time at which the difference phase angle $\psi_D$ reaches essentially 180°, with the output voltage $u_A$ preferably being formed using the formula:

$$u_A = u_{TX} \cdot \frac{1 - \frac{|\Phi_2|}{|\Phi_1|}}{2}.$$

Figure 3A:
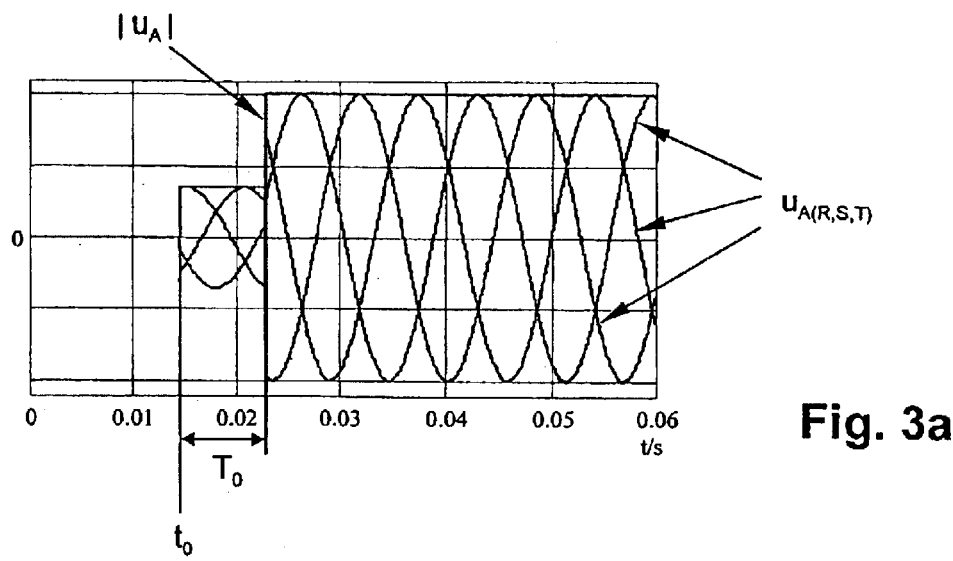

FIGS. 3a, b, c show signal profiles on the transformer 1 during its operation, in particular after a fault situation, for the difference phase angle $\psi_D$ in the interval $0°<\psi_D<180°$, and for an amplitude value $|\phi_2|$ of the second magnetic flux $\phi_2$ which is essentially greater than zero. In particular in FIG. 3c, which shows an illustration of the magnetic flux profiles transformed into a plane, the illustration shows that the magnetic flux $\phi$ on the transformer 1 at the time $t_0$, that is to say at the start time, is built up by the application of the output voltage $u_A$, which is calculated using the above formula, on the transformer 1, with an amplitude value $|\phi|$ of the magnetic flux $\phi$ being obtained as follows:

$$|\Phi| = \frac{1 - \frac{|\Phi_2|}{|\Phi_1|}}{2} |\Phi_1|.$$

Figure 3B:
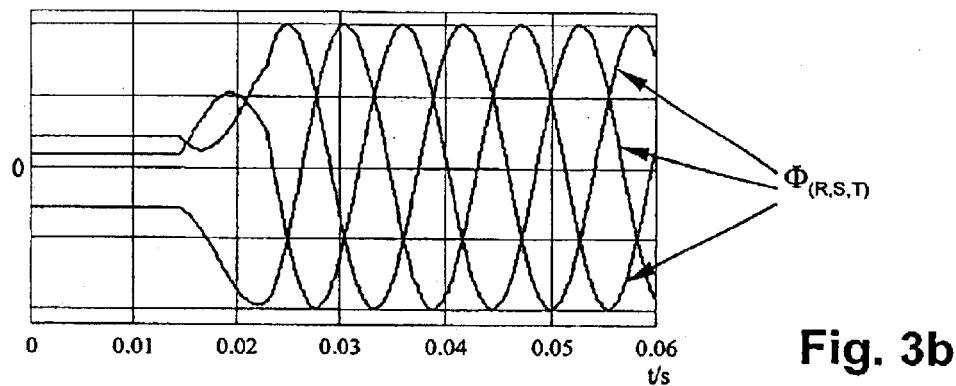
Figure 3C:
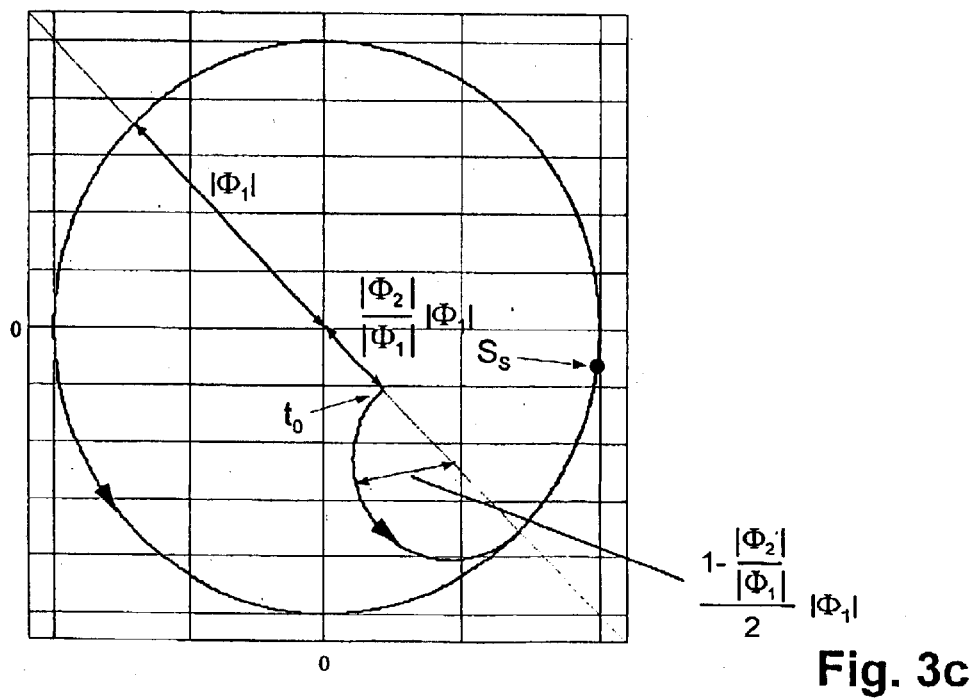

The output voltage $u_A$ is applied to the transformer 1, as already mentioned, for an adjustable time period $T_0$, in which case it has been found to be highly advantageous to choose the adjustable time period $T_0$ to be essentially half the period duration $T_N$ of a network AC voltage $u_N$ of the electrical AC voltage supply network 3. As shown in FIG. 3c, the magnetic flux $\phi$ of the transformer 1 reaches the value $|\phi_1|$ essentially once this time period $T_0$ has elapsed which, as already described, corresponds to the amplitude value $|\phi_1|$ of the first magnetic flux $\phi_1$ which was determined most recently before the maximum permissible value $i_{Amax}$ of the output current $i_A$ was exceeded. Once the adjustable time period $T_0$ has elapsed, the voltage source 2 is preferably driven such that the transformer voltage $u_{TX}$ which was determined most recently before the maximum permissible value $i_{Amax}$ of the output current $i_A$ was exceeded is applied as the output voltage $u_A$ from the voltage source 2 to the transformer 1. This measure means that the first flux $\phi_1$ of the transformer 1 can be maintained and that the electrical load 8 is supplied within a short time via the transformer 1 when a fault, as described above, occurs in the electrical AC supply network 3.

FIG. 3a furthermore shows the time profile of the output voltage $u_A$, in particular for a three-phase output voltage $u_{A(R,Y,B)}$ for a three-phase electrical AC voltage supply network 3 with the phases R,Y,B, although these are not shown in FIG. 1, for the sake of clarity. FIG. 3b furthermore shows the time profile of the magnetic flux $\phi_{(R,Y,B)}$ on the transformer 1, in particular for a three-phase electrical AC voltage supply network 3 with the phases R,Y,B.

According to the invention, if the difference phase angle $\psi_D$ is essentially in the interval $-180°<\psi_D<0°$, the adjustable switching time $t_0$ is chosen to be the time at which the difference phase angle $\psi_D$ reaches essentially 0°, with the output voltage $u_A$ preferably being formed using the formula $$u_A = u_{TX} \cdot \frac{1 + \frac{|\Phi_2|}{|\Phi_1|}}{2}.$$

Figure 4A:
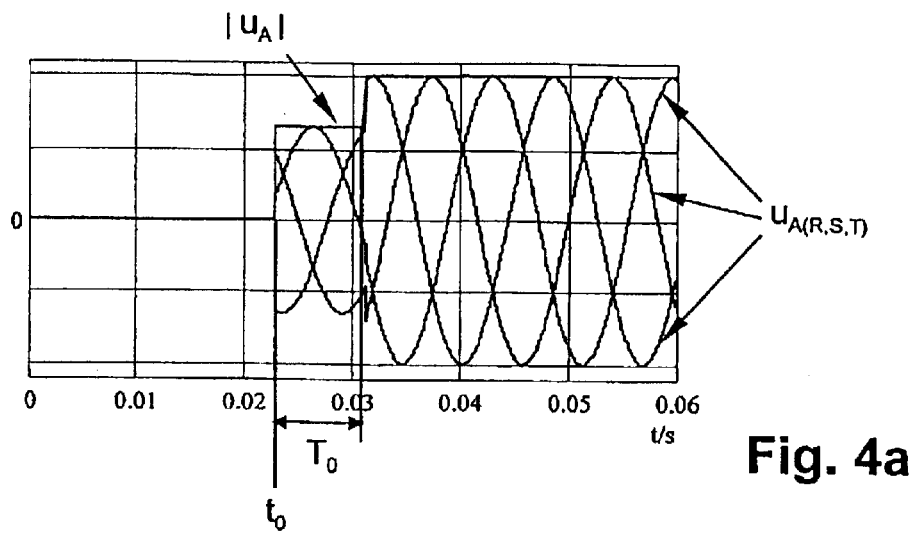
Figure 4B:
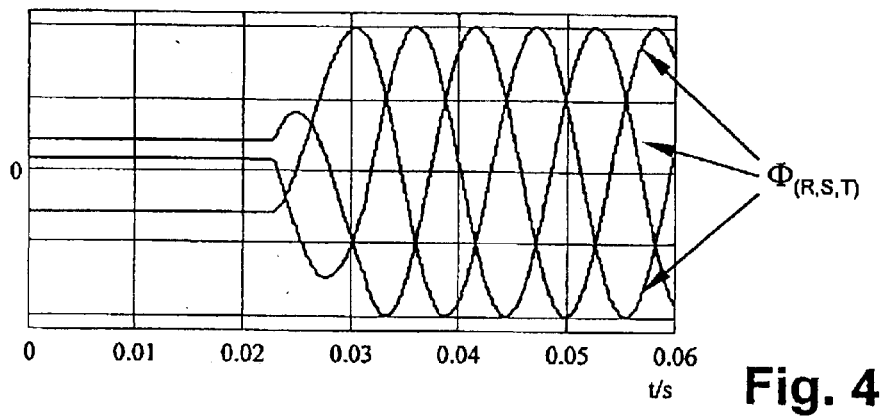
Figure 4C:
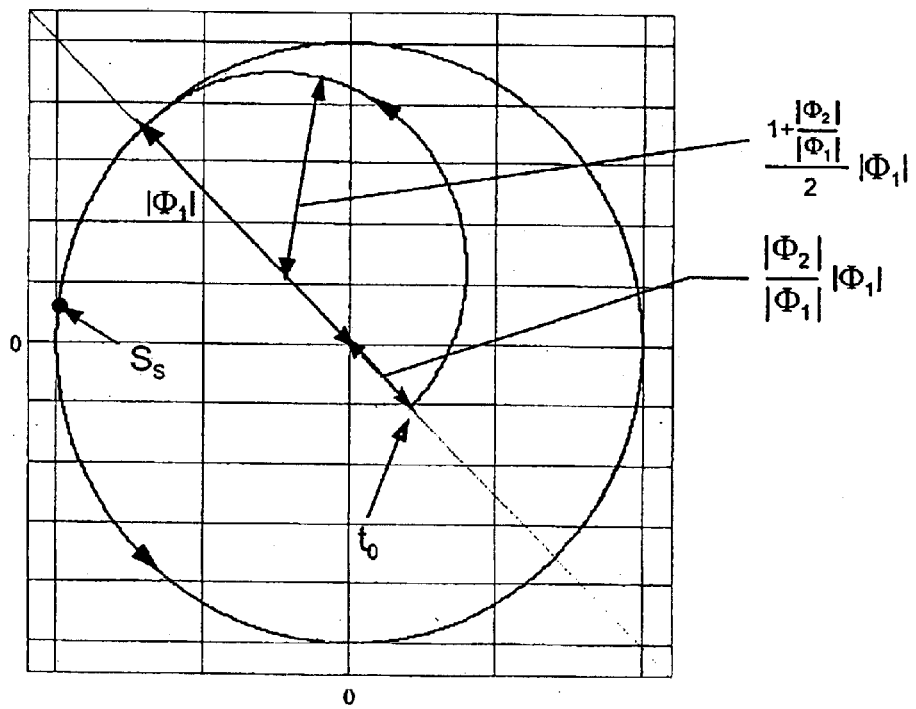

FIGS. 4a, b, c show the signal profiles on the transformer 1 during its operation, in particular after a fault situation, for the difference phase angle $\psi_D$ where $-180°<\psi_D<0°$ and for an amplitude value $|\phi_2|$ of the second magnetic flux $\phi_2$ which is essentially greater than zero. FIG. 4c, in particular, which shows a representation of the magnetic flux profiles transformed into a plane, shows that the magnetic flux $\phi$ on the transformer 1 builds up on the transformer 1 at the time $t_D$, that is to say at the start time by application of the output voltage $u_A$ as calculated in accordance with the above formula, with the amplitude value $|\phi|$ of the magnetic flux $\phi$ being obtained as follows:

$$|\Phi| = \frac{1 + \frac{|\Phi_2|}{|\Phi_1|}}{2} |\Phi_1|.$$

As already mentioned, the output voltage $u_A$ is applied to the transformer 1 for an adjustable time period $T_0$ in which case, in this situation as well, it has been found to be highly advantageous to choose essentially half the period duration $T_N$ of the network AC voltage $u_N$ of the electrical AC voltage supply network 3 as the adjustable time period $T_0$. As can be seen from FIG. 4c, the magnetic flux $\phi$ of the transformer 1 reaches the value $|\phi_1|$ essentially when this time period $T_0$ elapses, which, as already described, corresponds to the amplitude value $|\phi_1|$ of the first magnetic flux $\phi_1$ which was determined most recently before the maximum permissible value $i_{Amax}$ of the output current $i_A$ was exceeded. The voltage source 2 is preferably driven after the adjustable time period $T_0$ has elapsed such that the transformer voltage $u_{TX}$ which was determined most recently before the maximum permissible value $i_{Amax}$ of the output current $i_A$ was exceeded is applied to the transformer 1 as the output voltage $u_A$ from the voltage source 2. Thus, in this situation as well, this means that the first flux $\phi_1$ of the transformer 1 can be maintained, and that the electrical load 8 is supplied within a short time via the transformer 1 in the event of a fault, as described above, in the electrical AC voltage supply network 3.

FIG. 4a furthermore shows the time profile of the output voltage $u_A$, in particular for a three-phase output voltage $u_{A(R,Y,B)}$ for a three-phase electrical AC voltage supply network 3 with the phases R,Y,B. Furthermore, FIG. 4b shows the time profile of the magnetic flux $\phi_{(R,T,B)}$ on the transformer 1, in particular for a three-phase electrical AC voltage supply network 3 with the phases R,Y,B.

If the transformer 1 has been virtually completely demagnetized as a result of the fault situation as described above, then this is evident by the fact that the amplitude value $|\phi_2|$ of the second magnetic flux $\phi_2$ is essentially equal to zero after the occurrence of the fault. According to the invention, if such an amplitude value $|\phi_2|$ of the second magnetic flux $\phi_2$ is essentially equal to zero, the adjustable switching time $t_0$ is chosen to be the time at which the start signal $S_S$ occurs, with the output voltage $u_A$ being formed using the formula $$u_A = u_{TX} \cdot \frac{1}{2}.$$

Figure 5A:
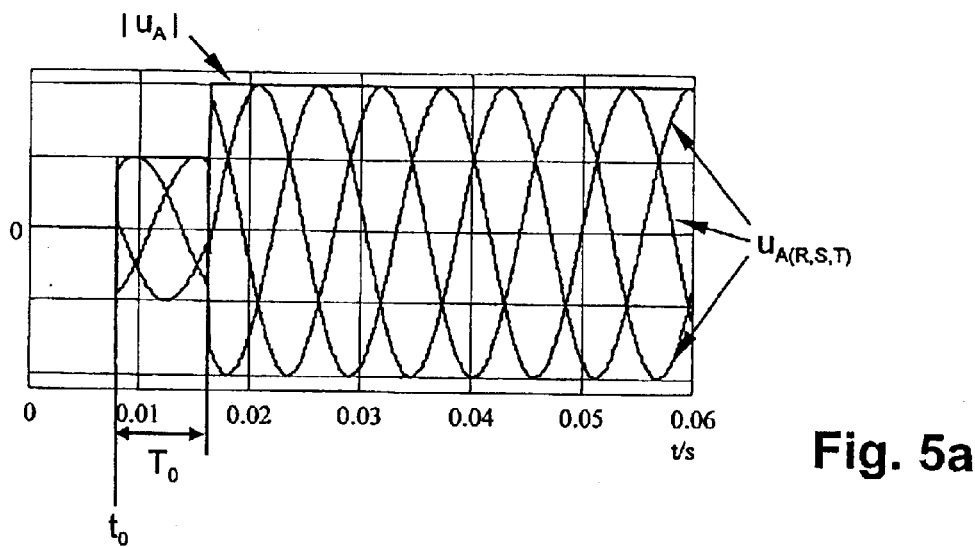
Figure 5B:
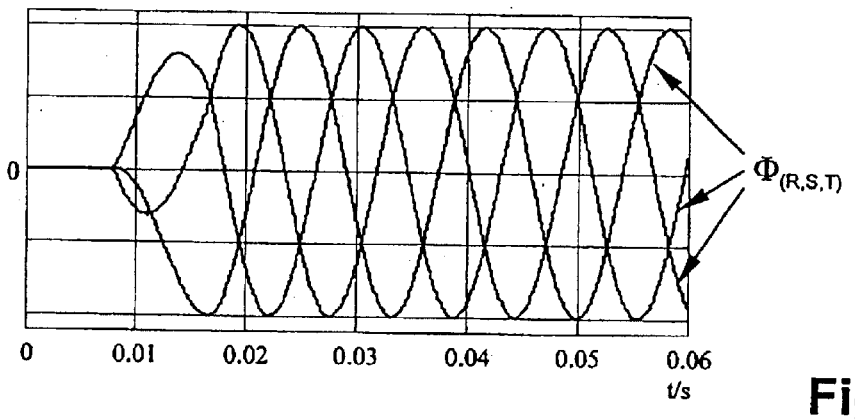
Figure 5C:
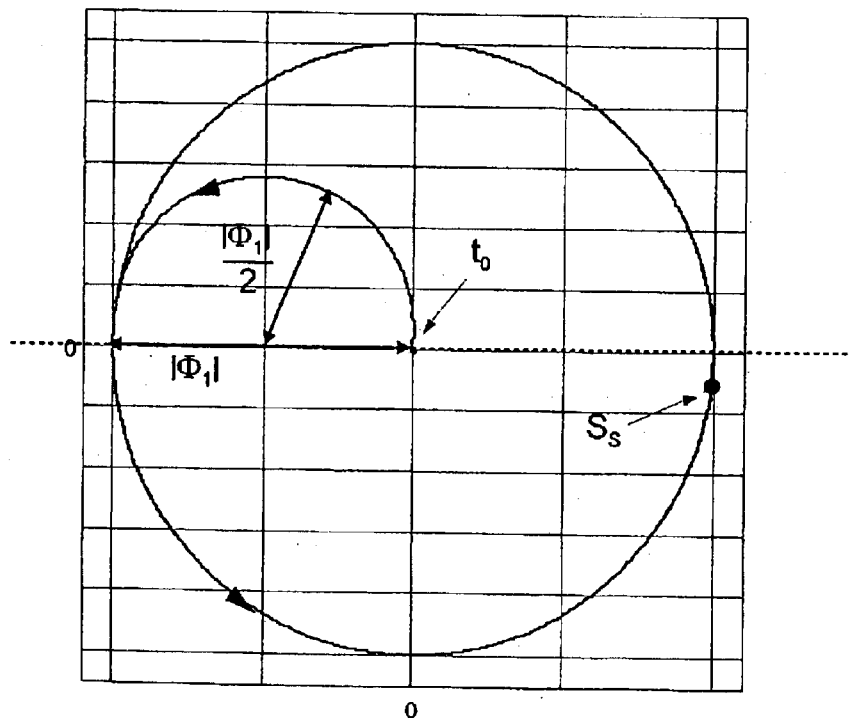

FIGS. 5a, b, c show signal profiles on the transformer 1 during its operation, in particular after a fault situation, for an amplitude value $|\phi_2|$ of a magnetic flux $\phi_2$, determined at the time of a start signal $S_S$, which is essentially equal to zero. FIG. 5c, which shows an illustration of the magnetic flux profiles transformed into a plane, shows that the magnetic flux $\phi$ on the transformer 1 at the time $t_0$, that is to say at the start time, is built up by application of the output voltage $u_A$, which is calculated using the formula above, on the transformer 1, with the amplitude value $|\phi|$ of the magnetic flux $\phi$ being obtained as follows:

$$|\Phi| = \frac{|\Phi_1|}{2}.$$

The output voltage $u_A$ in this case. as well is applied to the transformer 1 for an adjustable time period $T_0$, and it has once again been found to be advantageous in this case to choose the adjustable time period $T_0$ to be essentially half the period duration $T_N$ of the network AC voltage $u_N$ of the electrical AC voltage supply network 3.

According to FIG. 5c, the magnetic flux $\phi$ of the transformer 1 reaches the value $|\phi_1|$ essentially when this time period $T_0$ elapses, which, as already explained, corresponds to the amplitude value $|\phi_1|$ of the first magnetic flux $\phi_1$ which was determined most recently before the maximum permissible value $i_{Amax}$ of the output current $i_A$ was exceeded. The voltage source 2 is preferably driven after the adjustable time period $T_0$ has elapsed such that the transformer voltage $u_{TX}$ which was determined most recently before the maximum permissible value $i_{Amax}$ of the output current $i_A$ was exceeded is applied to the transformer 1 as the output voltage $u_A$ from the voltage source 2. In this case as well, this means that the first flux $\phi_1$ of the transformer 1 can be maintained, and the electrical load 8 is supplied within a short time via the transformer 1 when a fault is present, as described above, in the electrical AC voltage supply network 3.

FIG. 5a furthermore shows the time profile of the output voltage $u_A$, in particular for a three-phase output voltage $u_{A(R,Y,B)}$ for a three-phase electrical AC voltage supply network 3 with the phases R,Y,B. Furthermore, FIG. 5b shows the time profile of the magnetic flux $\phi_{(R,Y,B)}$ on the transformer 1, in particular fora three-phase electrical AC voltage supply network 3 with the phases R,Y,B.

With the method according to the invention as described above, in particular by the application of the output voltage $u_A$ which is formed to the transformer 1 for the adjustable time period $T_0$ after the adjustable switching time $t_0$, the magnetic flux advantageously builds up as quickly as possible to its value as known before the fault situation, without in the process exceeding the maximum permissible value $i_{Amax}$ of the output current $i_A$ from the voltage source 2, thus ensuring that the electrical load 8 can be supplied within a short time by the voltage source 2 via the transformer 1 when a fault as described above is present in the electrical AC voltage supply network 3, in particular within one period duration $T_N$ of the network AC voltage $u_N$ of the electrical AC voltage supply network 3 or, in the best case, within half the period duration $T_N$. This results in a high supply quality for the electrical load 8, and the capability to produce the supply rapidly from the voltage source 2 via the transformer 1 means that it is also possible to prevent damage or destruction to the electrical load 8, as can occur in the event of a lengthy supply failure.

The method according to the invention for operating the transformer 1 from the drivable voltage source 2 is not restricted just to a transformer 1, as described by way of example, from a three-phase electrical AC voltage supply network 3, but can likewise be used for a polyphase transformer 1, in general, and for a single-phase transformer 1. The method according to the invention can advantageously furthermore be used in general for partially demagnetized or essentially completely demagnetized transformers, and is thus not restricted to the fault situation described above.

On the basis of the embodiment illustrated in FIG. 1, the apparatus according to the invention for carrying out the method has a drive device 4 which is used for driving the voltage source 2, with the voltage source 2 producing the output voltage $u_A$ for feeding active power and/or a reactive component via the transformer 1 into the electrical AC voltage supply network 3, depending on the drive by means of the drive signals $S_a$. According to the invention, a first monitoring device 5 is provided for monitoring the output current $i_A$ from the voltage source 2 for a maximum permissible value $i_{Amax}$, and this monitoring device 5 is connected. on the input side to the drive device 4. As shown in FIG. 1, current measurement means 7 are furthermore connected to the input of the first monitoring device 5 in order to supply a signal corresponding to the output current $i_A$, with the current measurement means 7 preferably having a current transformer in order to produce such a signal.

Furthermore, when the maximum permissible value $i_{Amax}$ of the output current $i_A$ is exceeded, the first monitoring device 5 produces at its output a monitoring signal $S_X$, which is supplied to the drive device 4 via the connection. The drive device 4 is designed such that, when the maximum permissible value $i_{Amax}$ of the output current $i_A$ is exceeded, that is to say when the monitoring signal $S_X$ occurs, the voltage source 2 is disconnected from the transformer 1 by an appropriate drive. Such an overcurrent can occur in the event of a fault situation as already described in the method according to the invention.

Figure 2:
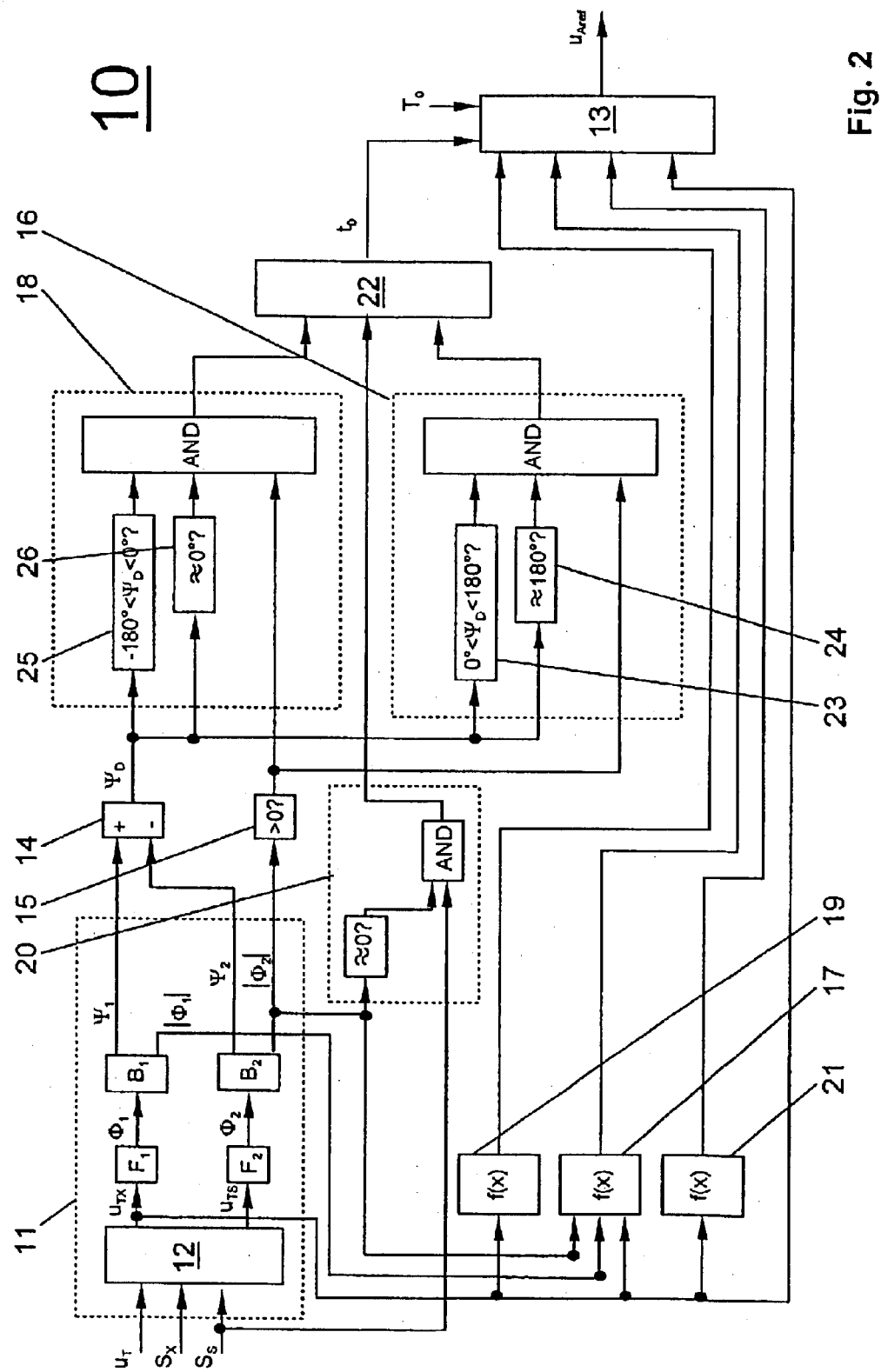
FIG. 2 shows an embodiment of a reference signal generator according to the invention, FIGS. 3a, b, c show signal profiles on the transformer during its operation, in particular after a fault situation, for a difference phase angle in the interval $0°<\psi_D<180°$, FIGS. 4a, b, c show signal profiles on the transformer during its operation, in particular after a fault situation, for a phase difference angle $\psi_D$ in the internal $-180°<\psi_D<0°$, and FIGS. 5a, b, c shows signal profiles on the transformer during its operation, in particular after a fault situation, for an amplitude value ($|\phi_2|$) of a magnetic flux $\phi_2$, as determined at the time of a start signal $S_S$, which is essentially equal to zero.

Furthermore, according to FIG. 1, first means 6 are provided for continuously determining the transformer voltage $u_T$ applied to the transformer 1, and a reference signal generator 10 is provided, which has second means 11 for continuously determining the magnetic flux $\phi$ of the transformer 1 and which is connected on the input side to the first means 6 and on the output side to the drive device 4. FIG. 2 shows an embodiment of the reference signal generator 10 according to the invention. As shown in FIG. 2, the reference signal generator 10 is designed such that, in response to the start signal $S_S$ which is supplied to the reference signal generator 10, an output voltage reference signal $u_{Aref}$, which corresponds to the output voltage $u_A$, is formed as a function of the transformer voltage $u_{TX}$ which is determined most recently before the maximum permissible value $i_{Amax}$ of the output current $i_A$ was exceeded and as a function of the first magnetic flux $\phi_1$, which was determined most recently before the maximum permissible value $i_{Amax}$ of the output current $i_A$ was exceeded, and of the second magnetic flux $\phi_2$ determined at the time of the start signal $S_S$. Furthermore, the reference signal generator 10 has an enable switching device 13, to which the output voltage reference signal $u_{Aref}$, the adjustable switching time $t_0$ and an adjustable time period $T_0$ are supplied in order to enable the output voltage reference signal $u_{Aref}$ at the output of the reference signal generator 10. The output voltage reference signal $u_{Aref}$ is supplied to the drive device 4 via the connection of the reference signal generator 10 to the input of the drive device 4 as shown in FIG. 1, and the drive device 4 then uses the output voltage reference signal $u_{Aref}$ to form appropriate drive signals $S_a$, as already mentioned above, for driving the voltage source 2. The enable device makes it possible to ensure that the output voltage reference signal $u_{Aref}$ which is formed is enabled for the time period $T_0$, after the time $t_0$, at the output of the reference signal generator 10, and is thus present for the time period $T_0$ from the time $t_0$, so that it is available to the drive device 4 for forming the drive signals $S_a$ for the voltage source 2. As already mentioned in the method according to the invention, it has been found to be advantageous to choose the adjustable time period $T_0$ to be essentially half the period duration $T_N$ of the network AC voltage $u_N$ of the electrical AC voltage supply network 3. As shown in FIG. 2, the enable switching device 13 is supplied with the transformer voltage $u_{TX}$ which was determined most recently before the maximum permissible value icon of the output current $i_A$ was exceeded, with the enable switching device 13 preferably being designed such that, once the adjustable time period $T_0$ has elapsed, the transformer voltage $u_{TX}$ which is supplied is produced as the output voltage reference signal $u_{Aref}$ at the output of the reference signal generator 10.

The reference signal generator 10 and its method of operation, in particular the formation of the output voltage reference signal $u_{Aref}$, will be described in detail in the following text with reference to FIG. 2. As shown in FIG. 2, the second means 11 are supplied with the transformer voltage $u_T$, with the second means 11 being designed such that the first magnetic flux $\phi_1$ is formed from the transformer voltage uT which was determined most recently before the maximum permissible value $i_{Amax}$ of the output current $i_A$ was exceeded, and the second magnetic flux $\phi_2$ is formed from a transformer voltage $u_{TS}$ determined at the time of the start signal $S_S$. For this purpose, the second means 11 have a selection device 12 at the input, to which selection device 12 the transformer voltage $u_T$, the start signal $S_S$ and the monitoring signal $S_X$ are supplied. Furthermore, the transformer voltage $u_{TX}$ which was determined most recently before the maximum permissible value $i_{Amax}$ of the output current $i_A$ was exceeded is emitted at the output from the second means 11. If the monitoring signal $S_X$ is present at the input to the selection device 12, then the transformer voltage $u_{TX}$ which was determined most recently before the maximum permissible value $i_{Amax}$ of the output current $i_A$ was exceeded is emitted at one output of the selection device 12. If the start signal $S_S$ is present at the input of the selection device 12, then the transformer voltage $u_{TS}$ determined at the time of the start signal $S_S$ is emitted at the output of the selection device 12. After this, by integration by means of integrators $F_1$, $F_2$, the first magnetic flux $\phi_1$ is formed from the transformer voltage $u_{TX}$ which was determined most recently before the maximum permissible value $i_{Amax}$ of the output current $i_A$ was exceeded, and the second magnetic flux $\phi_2$ is determined from the transformer voltage $u_{TS}$ determined at the time of the start signal $S_S$.

Furthermore, the second means 11 are designed as shown in FIG. 2 such that, according to the invention, the phase angle $\psi_1$ of the first magnetic flux $\phi_1$, the amplitude value $|\phi_1|$ of the first magnetic flux $\phi_1$, the phase angle $\psi_2$ of the second magnetic flux $\phi_2$ and an amplitude value $|\phi_2|$ of the second magnetic flux $\phi_2$ are formed and are produced at its output. For this purpose, the second means 11 have phase amplitude value forming devices $B_1$, $B_2$, which respectively use the first magnetic flux $\phi_1$ to form the associated phase angle $\psi_1$ of the first magnetic flux $\phi_1$ and the amplitude value $|\phi_1|$ of the first magentic flux $\phi_1$, and use the second magnetic flux $\phi_2$ to form the associated phase angle $\psi_2$ of the second magnetic flux $\phi_2$ and the amplitude value $|\phi_2|$ of the second magnetic flux $\phi_2$.

As shown in FIG. 2, the reference signal generator 10 also has a subtractor 14 in order to form a difference phase angles $\psi_D$ from the phase angle $\psi_1$ of the first magnetic flux $\phi_1$ and from the phase angle $\psi_2$ of the second magnetic flux $\phi_2$, with the subtractor 14 being connected to the output of the second means 11 in order to supply the phase angle $\psi_1$ of the first magnetic flux $\phi_1$ and the phase angle $\psi_2$ of the second magnetic flux $\phi_2$. The subtractor 14 is preferably in the form of a subtraction device. Furthermore, as shown in FIG. 2, a second monitoring device 15 is provided for monitoring the amplitude value $|\phi_2|$ of the second magnetic flux $\phi_2$ for a value which is essentially greater than zero, with the second monitoring device 15 emitting an appropriate signal when the monitoring condition mentioned above is satisfied. In order to supply the amplitude value $|\phi_2|$ of the second magnetic flux $\phi_2$, the second monitoring device 15 is connected on the input side to the output of the second means 11. The second monitoring device 15 and the subtractor 14 are connected to the input of a third monitoring device 16. The third monitoring device 16 is used for monitoring the difference phase angle $\psi_D$ essentially in the interval $0°<\psi_D<180°$. For this purpose, the third monitoring device 16 has a first comparator 23, which monitors the difference phase angle $\psi_D$ in the interval $0°<\psi_D<180°$ and emits an appropriate signal when this is satisfied. Furthermore, a second comparator 24 is provided for the third monitoring device 16, which monitors the difference phase angle $\psi_D$ for an angle of essentially 180°, and emits an appropriate signal when this angle is reached. When the difference phase angle $\psi_D$ reaches essentially 180° and the difference phase angle $\psi_D$ is in the interval $0° < \psi_D < 180°$, and when the amplitude value $|\phi_2|$ of the second magnetic flux $\phi_2$ is essentially greater than zero, that is to say when the appropriate signals are emitted from the second monitoring device 15, from the first comparator 23 and from the second comparator 24, the third monitoring device 16 chooses the time at which the difference phase angle $\psi_D$ reaches essentially 180° as the adjustable switching time $t_0$. To do this, the third monitoring device 16 is advantageously connected on the output side to a timebase 22, from which the third monitoring device 16 chooses the appropriate adjustable switching time $t_0$ for satisfying the conditions mentioned above.

Furthermore, as shown in FIG. 2, the second monitoring device 15 and the subtractor 14 are connected to the input of a fourth monitoring device 18. The fourth. monitoring device 18 is used for monitoring the difference phase angle $\psi_D$ essentially in the interval $-180° < \psi_D < 0°$. To do this, the fourth monitoring device 18 has a third comparator 25, which monitors the difference phase angle $\psi_D$ in the interval $-180° < \psi_D < 0°$, and emits an appropriate signal when this condition is satisfied. Furthermore, a fourth comparator 26 is provided in the fourth monitoring device 18, which monitors the difference phase angle $\psi_D$ for an angle of essentially 0°, and emits an appropriate signal when this angle is reached. When the difference phase angle $\psi_D$ reaches essentially 0° and the difference phase angle $\psi_D$ is in the interval $-180° < \psi_D < 0°$, and if the amplitude value $|\phi_2|$ of the second magnetic flux $\phi_2$ is essentially greater than zero, that is to say when the appropriate signals are being emitted from the second monitoring device 15, from the third comparator 25 and from the fourth comparator 26, the fourth monitoring device 18 chooses the time at which the difference phase angle $\psi_D$ reaches essentially 0° as the adjustable switching time $t_0$. The fourth monitoring device 18 is for this purpose likewise connected on the output side to the timebase 22, from which the fourth monitoring device 18 chooses the appropriate adjustable switching time $t_0$ when the conditions mentioned above are satisfied.

Furthermore, as shown in FIG. 2, a fifth monitoring device 20 is provided for monitoring the amplitude value $|\phi_2|$ of the second magnetic flux $\phi_2$ for a value which is essentially equal to zero, with the fifth monitoring device being connected on the input side to the output of the second means 11, in order to supply the amplitude value $|\phi_2|$ of the second magnetic flux $\phi_2$. The fifth monitoring device 20 is used for monitoring the amplitude value $|\phi_2|$ of the second magnetic flux $\phi_2$ for a value which is essentially equal to zero, with an appropriate signal being emitted when the monitoring condition mentioned above is satisfied. The fifth monitoring device 20 then chooses the time at which the amplitude value $|\phi_2|$ of the second magnetic flux $\phi_2$ is essentially equal to zero to be the adjustable switching time $t_0$. For this purpose, the fifth monitoring device 20 is likewise connected on the output side to the timebase 22, from which the fifth monitoring device 20 chooses the appropriate adjustable switching time $t_0$ when the condition mentioned above is satisfied.

Furthermore, as shown in FIG. 2, a first calculation unit 17 is provided in order to form the output voltage reference signal $u_{Aref}$, to which the transformer voltage $u_{TX}$, of the second means 11, which was determined most recently before the maximum permissible value $i_{Amax}$ of the output current $i_A$ was exceeded, the amplitude value $|\phi_1|$ of the first magnetic flux $\phi_1$ of the second means 11 and the amplitude value $|\phi_2|$ of the second magnetic flux $\phi_2$ of the second means 11 are supplied on the input side. The first calculation unit 17 preferably calculates the output voltage reference signal $u_{Aref}$ such that the output voltage $u_A$ is formed using the formula $$u_A = u_{TX} \cdot \frac{1 - \frac{|\Phi_2|}{|\Phi_1|}}{2}.$$

The first calculation unit 17 is connected on the output side to the input of the enable switching device 13 in order to supply the abovementioned output voltage reference signal $u_{Aref}$. This output voltage reference signal $u_{Aref}$ is then enabled after the associated chosen time $t_0$, that is to say in this case the time at which the difference phase angle $\psi_D$ reaches essentially 180°, for the time period $T_0$ at the output of the reference signal generator 10 by the enable switching device 13, and is then produced at the output of the reference signal generator 10 for the time period $T_0$ after this time $t_0$, so that it is available to the drive device 4 for forming the drive signals $S_a$ for the voltage source 2.

Furthermore, as shown in FIG. 2, a second calculation unit 19 is provided in order to form the output voltage reference signal $u_{Aref}$, to which the transformer voltage $u_{TX}$, of the second means 11 which was determined most recently before the maximum permissible value $i_{Amax}$ of the output current $i_A$ was exceeded, the amplitude value $|\phi_1|$ of the first magnetic flux $\phi_1$ of the second means 11 and the amplitude value $|\phi_2|$ of the second magnetic flux $\phi_2$ of the second means 11 are supplied on the input side. The second calculation unit 19 preferably calculates the output voltage reference signal $u_{Aref}$ such that the output voltage $u_A$ is formed using the formula $$u_A = u_{TX} \cdot \frac{1 + \frac{|\Phi_2|}{|\Phi_1|}}{2}.$$

The second calculation unit 19 is, like the first calculation unit 17, connected on the output side to the input of the enable switching device 13 in order to supply the output voltage reference signal $u_{Aref}$ as mentioned above. This output voltage reference signal $u_{Aref}$ is then enabled from the associated chosen time $t_0$, that is to say in this case the time at which the difference phase angle $\psi_D$ reaches essentially 0°, for the time period $T_0$ at the output of the reference signal generator 10 by the enable switching device 13, and is then produced at the output of the reference signal generator 10 for the time period $T_0$ after this time $t_0$, so that it is available to the drive device 4 for forming the drive signals $S_a$ for the voltage source 2.

Furthermore, as shown in FIG. 2, a third calculation unit 21 is provided for forming the output voltage reference signal $u_{Aref}$, to which the transformer voltage $u_{TX}$, which was determined most recently before the maximum permissible value $i_{Amax}$ of the output current $i_A$ was reached, of the second means 11, is supplied, with the third calculation unit 21 advantageously calculating the output voltage reference signal $u_{Aref}$ such that the output voltage $u_A$ is formed using the formula $$|\Phi| = \frac{|\Phi_1|}{2}.$$

The third calculation unit 21, like the first calculation unit 17 and the second calculation unit 19, is connected on the output side to the input of the enable switching device 13 in order to supply the abovementioned output voltage reference signal $u_{Aref}$. This output voltage reference signal $u_{Aref}$ is then enabled from the associated chosen time $t_0$, that is to say in this case the time at which the amplitude value $|\phi_2|$ of the second magnetic flux $\phi_2$ is essentially equal to zero, for time period $T_0$ at the output of the reference signal generator 10 by the enable switching device 13, and is then produced at the output of the reference signal generator 10 for the time period $T_0$ from this time $t_0$, so that it is available to the drive device 4 for forming the drive signals $S_a$ for the voltage source 2.

Overall, the apparatus according to the invention is distinguished by a very simple and cost-effective design, since the circuit complexity level is extremely low and, furthermore, only a small number of components are required to construct it.

A further improvement is achieved in that the reference signal generator 10 can be implemented in a digital microprocessor (which is not illustrated), so that there is advantageously no need, for example, for any discrete components and matching of the reference signal generator 10 to very different voltage sources 2 and/or transformers 1 is made easier, and thus can be carried out in a simple manner.

It is self-evident that those skilled in the art will be able to use blocks, units and signals other than those specified in the exemplary embodiment, with the same effect.

List of Reference Symbols

| | |
|---|---|
| 1 | Transformer |
| 2 | Voltage source |
| 3 | Electrical AC voltage supply network |
| 4 | Drive device |
| 5 | First monitoring device |
| 6 | First means |
| 7 | Current measurement means |
| 8 | Electrical load |
| 9 | Mains switch |
| 10 | Reference signal generator |
| 11 | Second means |
| 12 | Selection device |
| 13 | Enable switching device |
| 14 | Subtractor |
| 15 | Second monitoring device |
| 16 | Third monitoring device |
| 17 | First calculation unit |
| 18 | Fourth monitoring device |
| 19 | Second calculation unit |
| 20 | Fifth monitoring device |
| 21 | Third calculation device |
| 22 | Timebase |
| 23 | First |
| 24 | Second comparator |
| 25 | Third comparator |
| 26 | Fourth comparator |

What is claimed is:

1. A method for operating a transformer from a drivable voltage source, in which the voltage source is driven by means of drive signals ($S_a$) and produces an output voltage ($u_A$) for feeding active power and/or a reactive component via the transformer into an electrical AC voltage supply network, with an output current ($i_A$) from the voltage source being monitored for a maximum permissible value ($i_{Amax}$), wherein a transformer voltage ($u_T$) which is applied to the transformer is determined continuously, in that the magnetic flux ($\phi$) of the transformer is determined continuously, in that, when the maximum permissible value ($i_{Amax}$) of the output current ($i_A$) is exceeded, the voltage source is driven such that the voltage source is disconnected from the transformer, in that, in response to a start signal ($S_S$), an output voltage ($u_A$) is formed as a function of a transformer voltage ($u_{TX}$), which was determined most recently before the maximum permissible value ($i_{Amax}$) of the output current ($i_A$) was exceeded, and as a function of a first magnetic flux ($\phi_1$), which was determined most recently before the maximum permissible value ($i_{Amax}$)o the output current ($i_A$) was exceeded, and of a second magnetic flux ($\phi_2$) determined at the time of the start signal ($S_S$), and in that the voltage source is driven such that the output voltage ($u_A$) is applied to the transformer for an adjustable time period ($T_0$) after an adjustable switching time ($t_0$).

2. The method as claimed in claim 1, wherein the magnetic flux ($\phi$) is determined from the transformer voltage ($u_T$), with the first magnetic flux ($\phi_1$) being formed from the transformer voltage ($u_{TX}$) which was determined most recently before the maximum permissible value ($i_{Amax}$) of the output current ($i_A$) was exceeded, and the second magnetic flux ($\phi_2$) is formed from a transformer voltage ($u_{TS}$) determined at the time of the start signal ($S_S$).

3. The method as claimed in claim 1, wherein a phase angle ($\psi_1$) of the first magnetic flux ($\phi_1$) and a phase angle ($\psi_2$) of the second magnetic flux ($\phi_2$) are determined, in that a difference phase angle ($\psi_D$) is formed from the phase angle ($\psi_1$) of the first magnetic flux ($\phi_1$) and from the phase angle ($\psi_2$) of the second magnetic flux ($\phi_2$), and in that, if the amplitude value ($|\phi_2|$) of the second magnetic flux ($\phi_2$) is essentially greater than zero and if the difference phase angle ($\psi_D$) is essentially in the interval $0° < \psi_D < 180°$, the adjustable switching time ($t_0$) is chosen to be the time at which the difference phase angle ($\psi_D$) essentially reaches $180°$.

4. The method as claimed in claim 3, wherein the output voltage ($u_A$) is formed using the formula $$u_A = u_{TX} \cdot \frac{1 - \frac{|\phi_2|}{|\phi_1|}}{2}.$$

5. The method as claimed in claim 3, wherein, if the difference phase angle ($\psi_D$) is essentially in the interval $-180° < \psi_D < 0°$, the adjustable switching time ($t_0$) is chosen to be the time at which the difference phase angle ($\psi_D$) essentially reaches $0°$.

6. The method as claimed in claim 5, wherein the output voltage ($u_A$) is formed using the formula $$u_A = u_{TX} \cdot \frac{1 - \frac{|\phi_2|}{|\phi_1|}}{2}.$$

7. The method as claimed in claim 1, wherein, if the amplitude value ($|\phi_2|$ of the second magnetic flux ($\phi_2$) is essentially equal to zero, the adjustable switching time ($t_0$) is chosen to be the time at which the start signal ($S_S$) occurs.

8. The method as claimed in claim 7, wherein the output voltage ($u_A$) is formed using the formula $$u_A = u_{TX} \cdot \frac{1}{2}.$$

9. The method as claimed in claim 1, wherein half of the period, duration ($T_N$) of a network AC voltage ($u_N$) of the electrical AC voltage supply network is essentially chosen as the adjustable time period ($T_0$).

10. The method as claimed in claim 1, wherein, once the adjustable time period ($T_0$) has elapsed, the voltage source is driven such that the transformer voltage ($u_{TX}$) which was determined most recently before the maximum permissible value ($i_{Amax}$) of the output current ($i_A$) was exceeded is applied as the output voltage ($u_A$) to the transformer.

11. An apparatus for carrying out a method for operating a transformer from a drivable voltage source having a drive device which is used for driving the voltage source, with the voltage source producing an output voltage ($u_A$), in accordance with the drive, for feeding active power and/or a reactive component via the transformer into an electrical AC voltage supply network, wherein a first monitoring device is provided for monitoring an output current ($i_A$) from the voltage source for a maximum permissible value ($i_{Amax}$) and is connected on the input side to the drive device, in that first means are provided for continuously determining a transformer voltage ($u_T$) which is applied to the transformer, in that a reference signal generator is provided, which has second means for continuously determining the magnetic flux ($\phi$) of the transformer and which is connected on the input side to the first means and on the output side to the drive device, with the reference signal generator being designed such that, in response to a start signal ($S_S$) which is supplied to the reference signal generator, an output voltage reference signal ($u_{Aref}$) which corresponds to the output voltage ($u_A$) is formed as a function of a transformer voltage ($u_{TX}$), which was determined most recently before the maximum permissible value ($i_{Amax}$) of the output current ($i_A$) was exceeded, and as a function of a first magnetic flux ($\phi_1$) which was determined most recently before the maximum permissible value ($i_{Amax}$) of the output current ($i_A$) was exceeded, and of a second magnetic flux ($\phi_2$) determined at the time of the start signal ($S_S$), and in that the reference signal generator has an enable switching device, to which the output voltage reference signal ($u_{Aref}$), an adjustable switching time ($t_0$) and an adjustable time period ($T_0$) are supplied in order to enable the output voltage reference signal ($u_{Aref}$) at the output of the reference signal generator.

12. The apparatus as claimed in claim 11, wherein the second means are supplied with the transformer voltage ($u_T$), with the second means being designed such that the first magnetic flux ($\phi_1$) is formed from the transformer voltage ($u_{TX}$) which was determined most recently before the maximum permissible value ($i_{Amax}$) of the output current ($i_A$) was exceeded, and the second magnetic flux ($\phi_2$) is formed from a transformer voltage ($u_{TS}$) determined at the time of the start signal ($S_S$).

13. The apparatus as claimed in claim 11, wherein the second means are designed such that a phase angle ($\psi_1$) of the first magnetic flux ($\phi_1$), an amplitude value ($|\phi_1|$) of the first magnetic flux ($\phi_1$), a phase angle ($\psi_2$) of the second magnetic flux ($\phi_2$), an amplitude value ($|\phi_2|$) of the second magnetic flux ($\phi_2$) and the transformer voltage ($u_{TX}$) which was determined most recently before the maximum permissible value ($i_{Amax}$) of the output current ($i_A$) was exceeded are formed and are produced at its output, in that a subtractor is provided in order to form a difference phase angle ($\psi_D$) from the phase angle ($\psi_1$) of the first magnetic flux ($\phi_1$) and from the phase angle ($\psi_2$) of the second magnetic flux ($\phi_2$), and in that a second monitoring device is provided for monitoring the amplitude value ($|\phi_2|$) of the second magnetic flux ($\phi_2$) for a value which is essentially greater than zero.

14. The apparatus as claimed in claim 13, wherein the second monitoring device and the subtractor are connected to the input of a third monitoring device, with the third monitoring device being used for monitoring the difference phase angle ($\psi_D$) essentially in the interval $0° < \psi < 180°$, and the adjustable switching time ($t_0$) is chosen to be the time at which the difference phase angle ($\psi_D$) essentially reaches $180°$.

15. The apparatus as claimed in claim 14, wherein a first calculation unit, which is connected on the input side to the enable switching device, is provided in order to form the output voltage reference signal ($U_{Aref}$), to which the transformer voltage ($u_{TX}$) which was determined most recently before the maximum permissible value ($i_{Amax}$) of the output current ($i_A$) was exceeded, the amplitude value ($|\phi_1|$) of the first magnetic flux ($\phi_1$) and the amplitude value ($|\phi_2|$) of the second magnetic flux ($\phi_2$) are supplied on the input side, with the first calculation unit calculating the output voltage reference signal ($U_{Aref}$) such that the output voltage ($u_A$) is formed using the formula $$u_A = u_{TX} \cdot \frac{1 - \frac{|\phi_2|}{|\phi_1|}}{2}.$$

16. The apparatus as claimed in claim 13, wherein the second monitoring device and the subtractor are connected to the input of a fourth monitoring device, with the fourth monitoring device being used for monitoring the difference phase angle ($\psi_D$) essentially in the interval $-180° < \psi_D < 0°$, and the adjustable switching time ($t_0$) being chosen to be the time at which the difference phase angle ($\psi_D$) essentially reaches $0°$.

17. The apparatus as claimed in claim 16, wherein a second calculation unit, which is connected on the input side to the enable switching device, is provided in order to form the output voltage reference signal ($u_{Aref}$), to which the transformer voltage ($u_{TX}$) which was determined most recently before the maximum permissible value ($i_{Amax}$) of the output current ($i_A$) was exceeded, the amplitude value ($|\phi_1|$) of the first magnetic flux ($\phi_1$) and the amplitude value ($|\phi_2|$) of the second magnetic flux ($\phi_2$) are supplied on the input side, with the second calculation unit calculating the output voltage reference signal ($u_{Aref}$) such that the output voltage ($u_A$) is formed using the formula $$u_A = u_{TX} \cdot \frac{1 + \frac{|\phi_2|}{|\phi_1|}}{2}.$$

18. The apparatus as claimed in claim 13, wherein a fifth monitoring device is provided for monitoring the amplitude value ($|\phi_2|$) of the second magnetic flux ($\phi_2$) for a value which is essentially equal to zero, with the fifth monitoring device choosing the adjustable switching time ($t_0$) to be the time at which the start signal ($S_S$) occurs, when the amplitude value ($|\phi_2|$) of the second magnetic flux ($\phi_2$) is essentially equal to zero.

19. The apparatus as claimed in claim 18, wherein a third calculation unit, which is connected on the input side to the enable switching device, is provided in order to form the output voltage reference signal ($U_{Aref}$), to which the transformer voltage ($u_{TX}$) which was determined most recently before the maximum permissible value ($i_{Amax}$) of the output current ($i_A$) was exceeded is supplied, with the third calculation unit calculating the output voltage reference signal ($u_{Aref}$) such that the output voltage ($u_A$) is formed using the formula $$u_A = u_{TX} \cdot \frac{1}{2}.$$

20. The apparatus as claimed in claim 11, wherein half of the period duration ($T_N$) of a network AC voltage ($u_N$) of the electrical AC voltage supply network is essentially chosen as the adjustable time period ($T_0$).

21. The apparatus as claimed in claim 11, wherein the enable switching device is supplied with the transformer voltage ($u_{TX}$) which was determined most recently before the maximum permissible value ($i_{Amax}$) of the output current ($i_A$) was exceeded, with the enable switching device being designed such that the transformer voltage ($u_{TX}$) which is supplied is produced as the output voltage reference signal ($u_{Aref}$) at the output once the adjustable time period ($T_0$) has elapsed.

22. The apparatus as claimed in claim 11, wherein the reference signal generator is implemented in a digital microprocessor.

* * * * *